United States Patent
Jiang et al.

(10) Patent No.: US 11,582,067 B2
(45) Date of Patent: Feb. 14, 2023

(54) SYSTEMS AND METHODS FOR PROVIDING NETWORK CONNECTORS

(71) Applicant: Arista Networks, Inc., Santa Clara, CA (US)

(72) Inventors: Kanzhe Jiang, Los Altos Hills, CA (US); Richard Forster, San Francisco, CA (US); Ryan Izard, Manteca, CA (US); Christian Geddings Barrineau, San Jose, CA (US); Junaid Zulfiqar, Mountain View, CA (US)

(73) Assignee: Arista Networks, Inc., Santa Clara, CA (US)

( * ) Notice: Subject to any disclaimer, the term of this patent is extended or adjusted under 35 U.S.C. 154(b) by 17 days.

(21) Appl. No.: 17/068,360

(22) Filed: Oct. 12, 2020

(65) Prior Publication Data
US 2021/0111925 A1   Apr. 15, 2021

Related U.S. Application Data

(60) Provisional application No. 62/914,936, filed on Oct. 14, 2019.

(51) Int. Cl.
*H04L 12/46* (2006.01)
*H04L 45/586* (2022.01)
*H04L 45/00* (2022.01)
*H04L 49/00* (2022.01)

(52) U.S. Cl.
CPC ........ *H04L 12/4633* (2013.01); *H04L 45/586* (2013.01); *H04L 45/66* (2013.01); *H04L 49/3009* (2013.01)

(58) Field of Classification Search
USPC ......................................................... 709/249
See application file for complete search history.

(56) References Cited

U.S. PATENT DOCUMENTS

| | | | | |
|---|---|---|---|---|
| 2010/0061250 | A1* | 3/2010 | Nugent | H04L 41/5045 370/242 |
| 2015/0052523 | A1* | 2/2015 | Raghu | H04L 63/0272 718/1 |
| 2015/0124823 | A1 | 5/2015 | Pani et al. | |
| 2015/0271303 | A1 | 9/2015 | Neginhal et al. | |
| 2016/0021032 | A1 | 1/2016 | Maier et al. | |
| 2016/0072733 | A1* | 3/2016 | Murray | H04L 49/351 370/395.53 |
| 2016/0315811 | A1* | 10/2016 | Yadav | H04L 43/045 |
| 2017/0097841 | A1* | 4/2017 | Chang | H04L 12/4633 |

* cited by examiner

*Primary Examiner* — Hermon Asres
(74) *Attorney, Agent, or Firm* — Treyz Law Group, P.C.; Tianyi He

(57) ABSTRACT

A networking system may include a first network such as a private cloud network and a second network such as a public cloud network. The first network may include a switch coupled to a computing resource. To facilitate a robust and flexible inter-network connection, the networking system may include network connector circuitry having a connector endpoint at the first network and a network connector coupling the connector endpoint to a network element at the second network. A controller for the first network may provide control signals and configuration data to the network connector circuitry to form the connection to the second network and may configure the switch to forward external network traffic to and from the connector endpoint via a switch port directly coupled to the connector endpoint.

19 Claims, 9 Drawing Sheets

SYSTEMS AND METHODS FOR PROVIDING NETWORK CONNECTORS

This patent application claims the benefit of U.S. provisional patent application No. 62/914,936, filed Oct. 14, 2019, which is hereby incorporated by reference herein in its entirety.

BACKGROUND

This relates to communication networks, and more particularly, to one or more communications networks having network switches that are controlled by controller circuitry.

Packet-based networks include network switches. Network switches are used in forwarding network traffic (e.g., packets) between end hosts (e.g., from packet sources to packet destinations). The controller circuitry can be used to control the network switches in forwarding network traffic within a first network such as a private cloud network.

In some applications, it may be more efficient (e.g., computationally, cost-wise, etc.) for a user to maintain some portions of the workload (e.g., computing resources coupled to the network switches) on the first network while moving other portions of the workload onto a second network such as a public cloud network. Doing so may require establishing and managing a satisfactory connection between the two networks. However, the design and management of this type of connection are non-trivial tasks and may be challenging for a user.

It is within this context that the embodiments described herein arise.

DETAILED DESCRIPTION

A controller is configured to control a plurality of network switches for a first network such as a private cloud network. The network switches are coupled to end hosts such as a plurality of computing resources (e.g., compute and/or storage resources, computing or processing circuitry, storage circuitry, networking circuitry configured to form logical network elements, and/or other network circuitry, which are generally referred to as computing resources herein). For some applications, it may be desirable to maintain some workloads on the computing resources on the first network while offloading other workloads to computing resources on a second network such as a public cloud network. However, in these multi-cloud or more specifically, hybrid-cloud systems, the connectivity between the first and second networks is critical to system performance, but may be complex to design, implement, and manage for a user, especially in combination with the management of other network elements such as the network switches in the first network.

To provide a satisfactory connection between the first and second networks and simplify the design, implementation, and management of the connection, the first network can include network connector circuitry configured to form connections with one or more other networks of various types such as public cloud networks provided by various public cloud platforms (e.g., each associated with a different public cloud provider or company). The controller circuitry for the first network may be configured to automate the end-to-end connectivity between respective network elements in the first network and in the other networks using the network connector circuitry. As an example, the controller circuitry may provide consistent routing policies (e.g., corresponding flow tables) to network elements (e.g., switches) in the first network to ensure proper routing between networks in the multi-cloud system.

In particular, the network connector circuitry may include a network connector endpoint coupled to a port of a network switch in the first network. The network connector circuitry may also include a cloud network connector coupled to the network connector endpoint. The cloud network connector may store and/or process one or more (software) drivers and workflows for supporting corresponding connections to and from one or more other networks of corresponding types.

By providing the network connector circuitry and other network elements configured in the manner described herein, a multi-cloud system may implement reliable and automated end-to-end connectivity between various types of networks without the need for a user to manually manage inter-network connectivity, thereby improving user experience. The network switches, network connector circuitry, the network controller circuitry, and other elements in accordance with the present embodiments are described in further detail herein.

Network Connectivity and Network Elements

Figure 1:
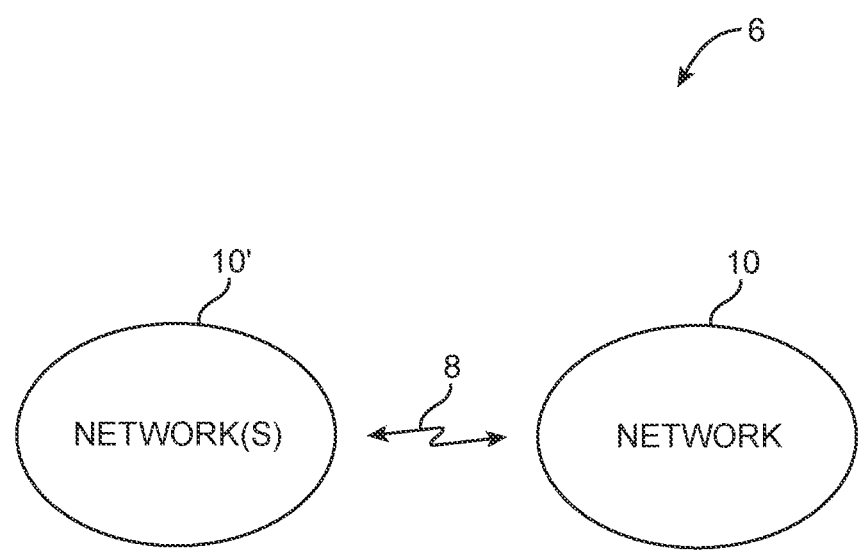
FIG. 1 is a diagram of an illustrative multi-network system having connectivity between two networks in accordance with some embodiments.

Computers and other computing resources are often connected to each other via one or more network elements or nodes in a network such as network 10 in FIG. 1. In some environments, network 10 can operate within a larger multi-network system such as system 6 and is therefore interconnected with one or more other disparate networks 10' via one or more corresponding connections or links 8.

Networks such as network 10 and network 10' may each be implemented in any suitable manner (e.g., as an enterprise private network, a campus area network, a local area network, a wide area network, or as a network of any other scope, as a cloud network connecting computing resources on server hardware, as a public cloud network shared by multiple entities, as a private cloud network secured for a single entity or enterprise, or any other suitable cloud network, or as any other suitable network or a network having a combination of these characteristics). Configurations in which network 10 is implemented as a private cloud network and network 10' is implemented as a public cloud network are described herein as illustrative examples. In these configurations, system 6 may be referred to herein as a multi-cloud system or a multi-cloud network, or more specifically, a hybrid-cloud network.

Networks such as network 10 (and/or network 10') can rely on packet-based switches for intra-network and/or inter-network communication. These switches, which are sometimes referred to herein as network switches, packet processing systems, or packet forwarding systems can forward packets based on address information. In this way, data packets that are transmitted by a packet source may be delivered to a packet destination. Packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server (sometimes referred to herein as controller circuitry or management circuitry) may interact with each of the control clients over respective network links. The use of a cross-platform controller and corresponding controller clients allows potentially disparate network switch equipment to be centrally managed.

Figure 2:
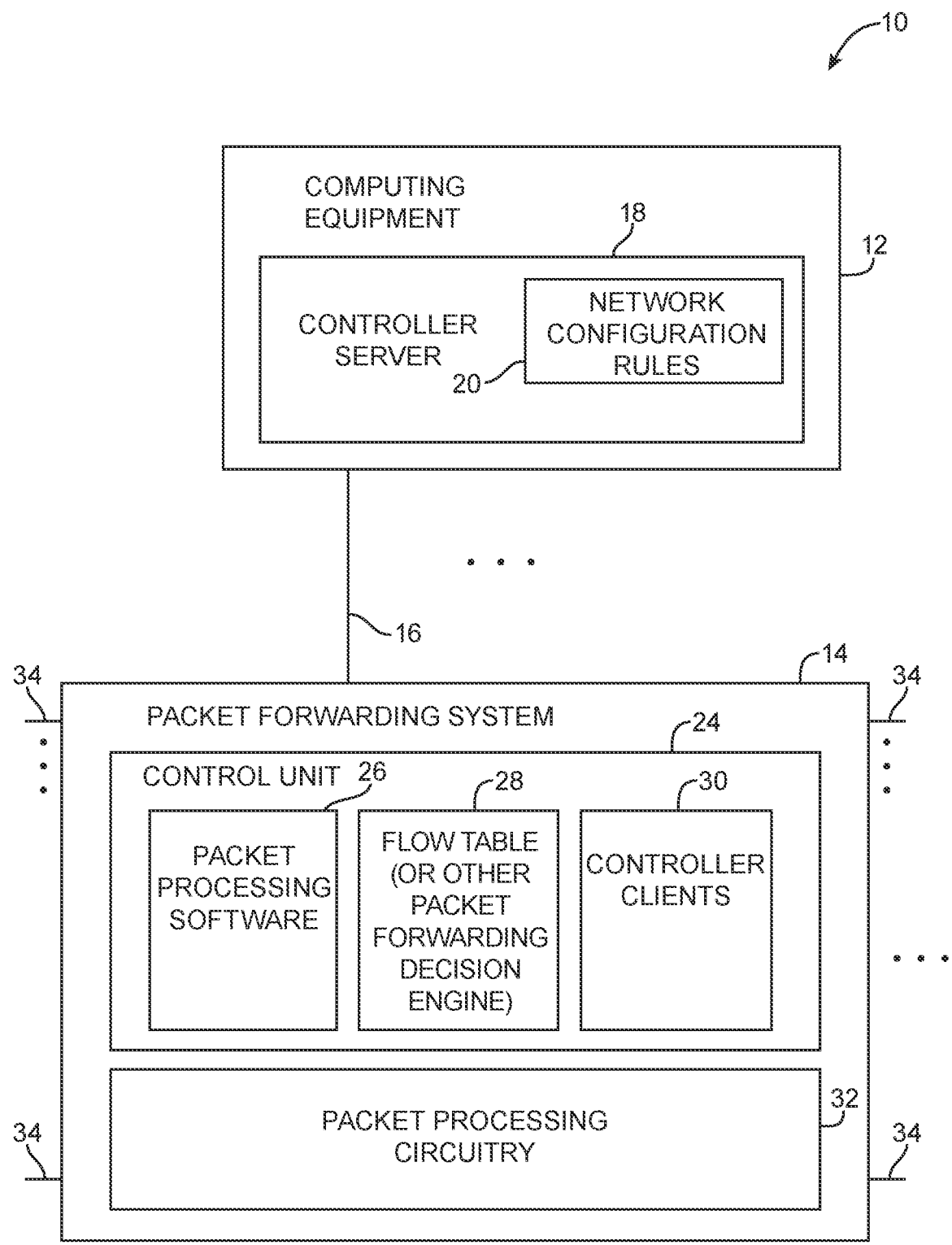
FIG. 2 is a diagram of an illustrative network that includes controller circuitry and a packet forwarding system in accordance with some embodiments.

With one illustrative configuration, which is sometimes described herein as an example, centralized control is provided by one or more controller servers such as controller server 18 of FIG. 2. Controller server 18 may be implemented on a stand-alone computer, on a cluster of computers, on a set of computers that are distributed among multiple locations, on hardware that is embedded within a network switch, or on other suitable computing equipment 12. Computing equipment 12 may include processing and memory circuits (e.g., one or more microprocessors, memory chips, non-transitory computer-readable storage media, and other control circuitry) for storing and processing control software (e.g., the functions of controller server 18). Controller server 18 can run as a single process on a single computer or can be distributed over several hosts for redundancy. The use of a distributed arrangement may help provide network 10 with resiliency against unexpected network partitions (e.g., a situation in which one or more network links between two network portions is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 2 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data (e.g., configuration data) to the hardware in network 10 (e.g., switch hardware) to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20 (e.g., network policy information, user input information). Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16. Each switch (e.g., each packet forwarding system) 14 may have input-output ports 34 (sometimes referred to as ports or network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuitry 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, non-transitory computer-readable storage media, and other control circuitry) for storing and running control software, and may sometimes be referred to as control circuit 24. Control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage (e.g., native) resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As one particular example, packet forwarding decision engines may direct packet forwarding system 14 to forward network packets to predetermined ports based on attributes of the network packets (e.g., based on network protocol headers).

In general, the packet forwarding decision engine may perform any suitable type of processing (associated with any corresponding networking protocol) to assist packet forwarding system 14 in making forwarding decisions of network packets. Configurations in which a forwarding network includes switches storing flow tables useable in making switching, forwarding, and routing decisions are described herein as illustrative examples. The principles of the embodiments described herein may similarly be implemented in forwarding networks that include switches or network elements of other types (e.g., switches or packet forwarding systems that omit flow tables, switches or other network elements that utilize non-flow-table-based switching and routing schemes, switches or other network elements that utilize any suitable network switching or routing protocols, etc.).

In accordance with some illustrative embodiments described herein, any desired switch may be provided with controller clients that communicate with and are controlled by a controller server. For example, switch 14 may be implemented using a general-purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. Switch 14 may be implemented as commodity or white box switches, if desired. The controller server may, if desired, be implemented on one or more line cards in the rack-based system, in another rack-based system, or on other computing equipment (e.g., equipment separate from the rack-based system) that is coupled to the network.

Figure 3:
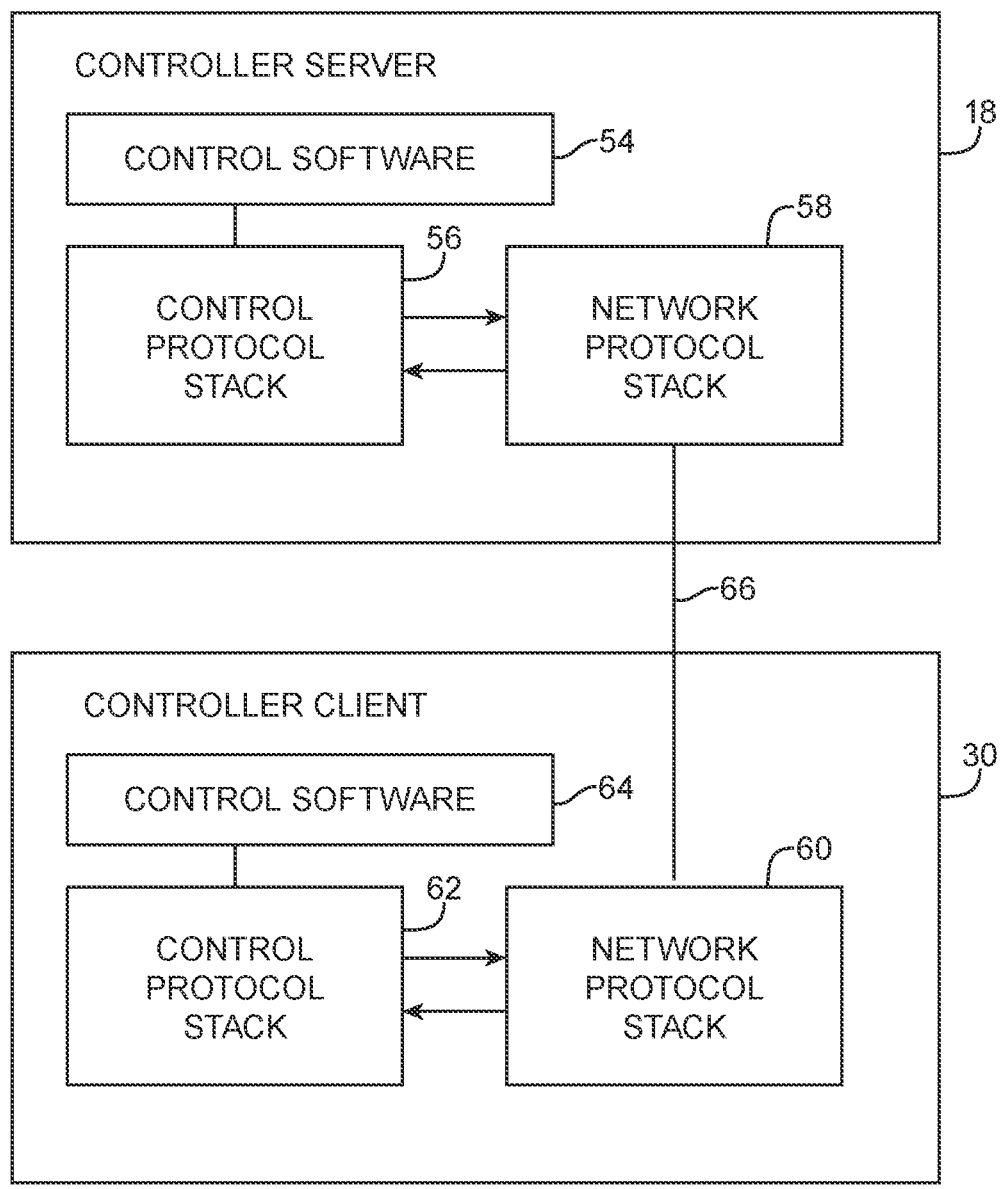
FIG. 3 is a diagram of a controller server and controller client that may communicate over a network connection in accordance with some embodiments.

As shown in FIG. 3, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 2) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stack 56 generates and parses control protocol messages (e.g., control messages to activate a port or to install a particular flow table entry into flow table 28). By using arrangements of the type shown in FIG. 3, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Illustrative Flow Table Entries and Packet Processing

Figure 4:
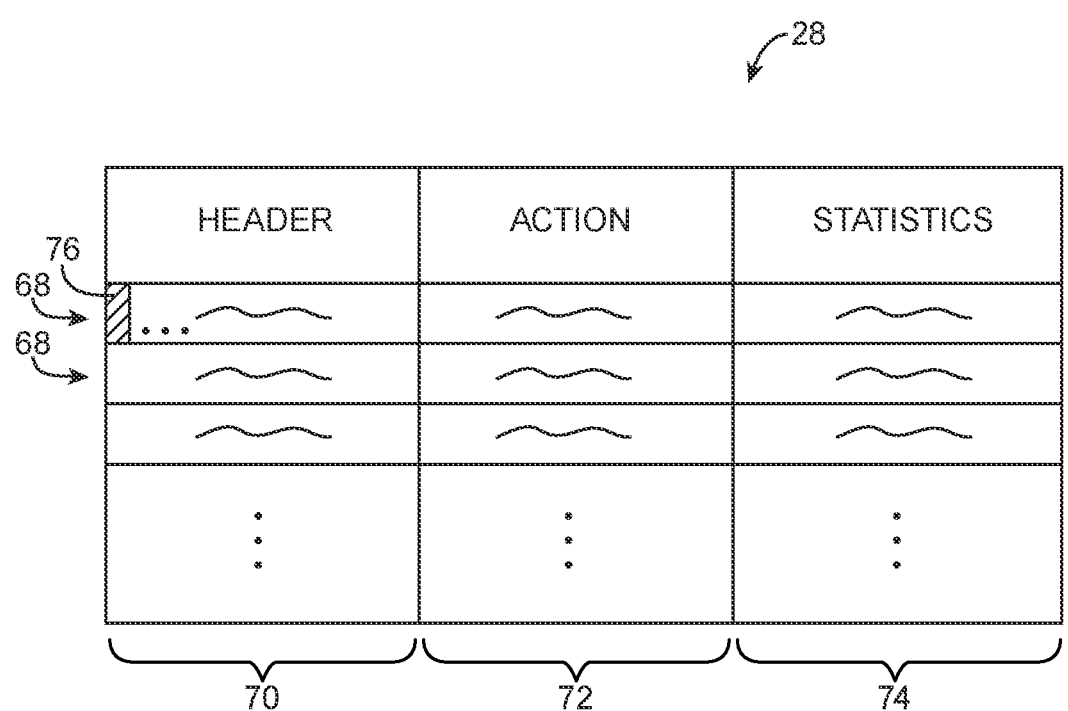
FIG. 4 is a diagram of an illustrative flow table of the type used by a packet processing system in accordance with some embodiments.

An illustrative flow table is shown in FIG. 4. As shown in FIG. 4, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped.

The examples of flow table entries in FIG. 4 are merely illustrative. If desired, each flow table entry may be translated to one or more entries in multiple corresponding application-specific integrated circuit (ASIC) forwarding tables (e.g., tables for a network switch integrated circuit forming switch 14) by the corresponding client on each switch 14. These flow table entries may be conveyed to and stored at controller client 30 (FIG. 3) in any suitable format (e.g., these flow table entries are a representation of various packet forwarding schemes useable by different network switch circuitry architectures). In other words, depending on the specific configuration of switch 14 (e.g., the type of networking switch control unit or architecture, the type of packet processing circuitry architecture, the type of forwarding ASIC programming architecture, the ASIC-specific implementation of switch 14), any suitable representation of each flow table entry may be stored at and used by switch 14 (and/or at controller server 18).

If desired, the flow table entries may include fields with wildcards. When a wildcard is present in a particular field, all incoming packets will be considered to form a "match" with respect to the field, regardless of the particular value of the field in the incoming packet. Additional fields may match additional packet information (e.g., packet header information of network packets). As examples, the flow table entries may be used to perform ethernet switching, internet routing, and firewalling. If desired, table entries performing any suitable networking functions may be used.

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

When configured with configuration data (e.g., flow table entries or any other suitable packet switching, routing, or matching information) from controller server 18, switch 14 may process packets that are received on input-output ports 34. As an example, switch 14 may compare the fields of the received packet to the fields of the flow table entries in flow table 28 of that switch to determine whether there is a match and to take one or more corresponding actions defined by the flow table entries. If there is no match between the fields of the packet and the corresponding fields of the flow table entries, switch 14 may send the packet to controller server 18 over link 16. If there is a match between the packet and a flow table entry, switch 14 may perform the action that is associated with that flow table entry and may update the counter value in the statistics field of that flow table entry.

Network Configuration

Figure 5:
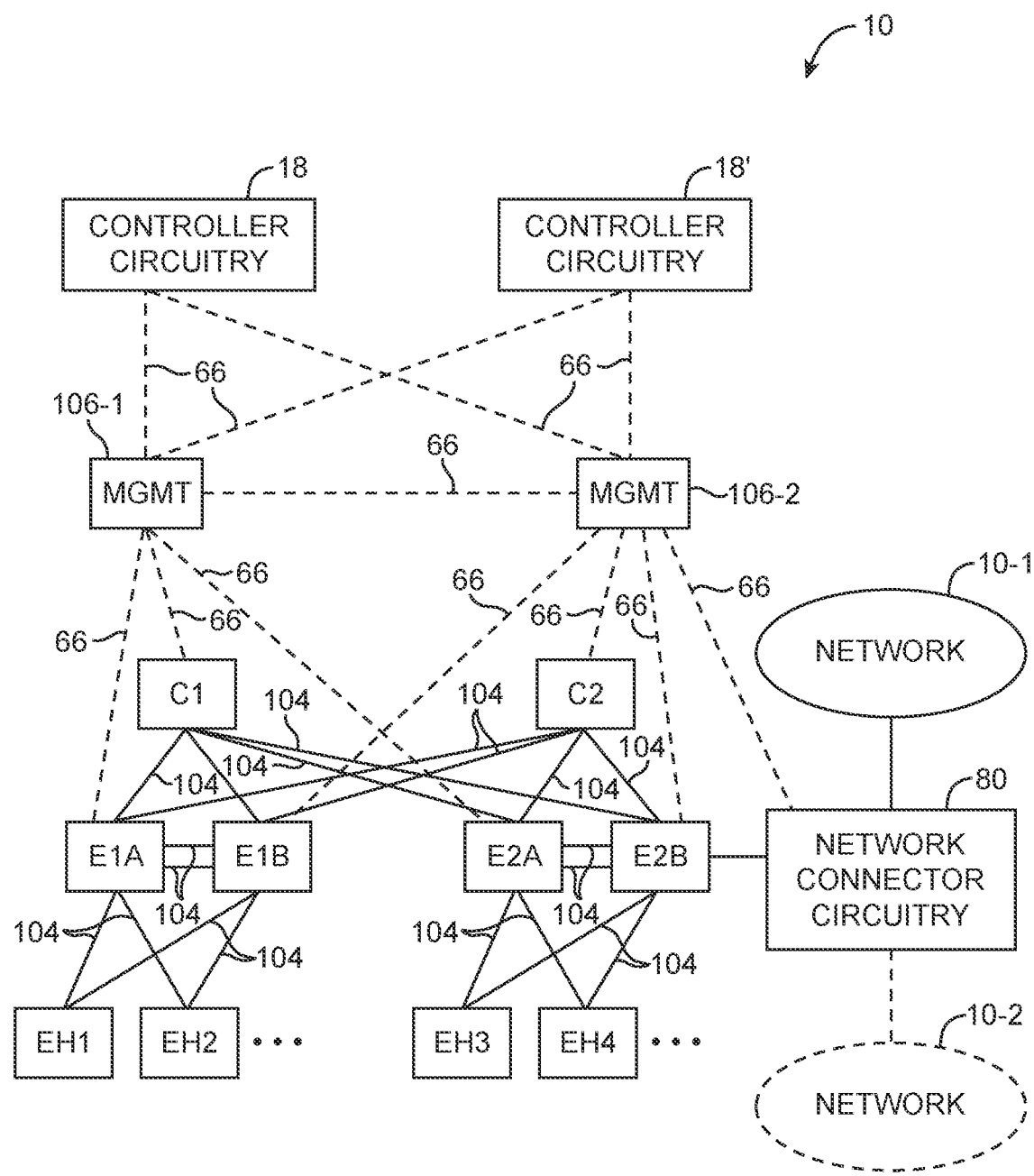
FIG. 5 is a diagram of an illustrative underlying network having switches for forwarding network packets between end hosts and having network connector circuitry for connecting to other networks in accordance with some embodiments.

FIG. 5 is a diagram of an illustrative network 10 in which switches may be controlled by a controller 18 (sometimes referred to herein as controller circuitry, management circuitry, a controller or management module, or a controller or management system). Controller 18 may be a controller server or a distributed controller implemented across multiple computing equipment. As shown in FIG. 5, network switches may be controlled by an active controller 18. If desired, a backup controller 18' may be activated and may provide back-up and/or auxiliary control when one or more portions of controller 18 is inactive (e.g., due to device failure, device diagnostics, etc.).

Controller 18 (or controller 18' when active) may provide control and configuration data (e.g., control signals, configuration data such as switch flow table entries or corresponding ASIC forwarding table entries, routing table associations, test packets, probe packets, etc.) for controlling network 10 to management devices 106-1 and 106-2 via paths 66. Switch management devices 106-1 and 106-2 may further distribute the control and configuration data across switches in network 10 via paths 66, each of which may be formed from a corresponding wired connection. If desired, management devices 106-1 and 106-2 may be physically separate from portions of controller 18 to more conveniently perform switch management functions. For clarity, management devices 106-1 and 106-2, may be considered to form a portion of controller 18, and are separately shown in FIG. 5 for illustrative purposes.

As shown in FIG. 5, network 10 includes switches C1, C2, E1A, E1B, E2A, and E2B. Controller 18 is coupled to the switches of network 10 via control paths 66. Controller 18 controls the switches using control paths 66 (e.g., by providing flow table entries such as flow table entries 68 of FIG. 4 or corresponding ASIC forwarding table entries). As described herein as examples, switches C1, C2, E1A, E1B, E2A, and E2B in network 10 may be configured in the manner described in connection with FIGS. 1-4.

Network 10 includes end hosts such as end hosts EH1, EH2, EH3, and EH4 that are coupled to the switches of network 10 (e.g., to switches E1A, E1B, E2A, and E2B). Switches that are directly coupled to end hosts are sometimes referred to as edge switches or leaf switches, whereas switches that merely interconnect other switches and are not directly coupled to the end hosts are sometimes referred to as core switches or spine switches. In the example of FIG. 5, switches E1A, E1B, E2A, and E2B are edge switches, because they are directly coupled to end hosts. Switches C1 and C2 are core switches, because switches C1 and C2 interconnect switches E1A, E1B, E2A, and E2B and are not directly coupled to end hosts.

As shown in FIG. 5, switch C1 is coupled to switches E1A, E1B, E2A, and E2B (at different corresponding ports of switch C1) via corresponding data paths 104 sometimes referred to herein as data forwarding paths or packet forwarding paths. Similarly, switch C2 is coupled to each of the four edge switches (at different corresponding ports of switch C2) via corresponding data paths 104. These data paths 104 also couple corresponding edge switches to respective end hosts at different corresponding ports of the respective edge switches and provide peer connections between edge switches. In the example of FIG. 5, control paths 66 in the control plane are separate from the data paths 104 in the data plane. However, if desired, one or more portions of control paths 66 may include one or more portions of data paths 104.

The network configuration of network 10 in FIG. 5 is merely illustrative. If desired, network 10 may include any number of spine and leaf switches coupled to any number of end hosts using any suitable number of network connections. If desired, network 10 may include any other suitable networking equipment or network nodes (e.g., other than spine and leaf switches) and may include the corresponding network connections to these additional network elements.

External Network Connector Circuitry

In some applications, it may be desirable that network 10 (e.g., end hosts coupled to switches in network 10) not operate in isolation. In particular, network 10 may desirably be coupled to and communicate with other networks 10' (FIG. 1) such as networks 10-1 or network 10-2 in FIG. 5. As an illustrative example, a hybrid-cloud system may include a private cloud network coupled to a public cloud network such that computing resources and other resources on each corresponding network may operate coherently with one another. In such an example, end hosts EH1, EH2, EH3, EH4 may implement computing resources for a private cloud network 10 that operate integrally with computing resources for public cloud network 10-1 (or public cloud network 10-2). As such, the combination of networks 10 and 10-1 may form a larger multi-network system (e.g., a hybrid-cloud network).

Given the integral manner in which corresponding computing resources for disparate networks need to operate in such a system, the connections between the disparate (private and public) networks are critical to providing satisfactory performance using a hybrid-cloud computing scheme. However, given the number of different types of networks available to form the multi-network system (e.g., the number of public cloud platforms useable to form corresponding public cloud networks of different types) and the different and often complex requirements associated with communicating with each of these networks, it is often burdensome for a user to manually configure these connections. This is especially considering that a connection configured for one network (e.g., network 10-1) may not provide satisfactory performance or may not even function for another network (e.g., network 10-2), further illustrating the disadvantages of the manual configuration approach. Additionally, the processes of designing, implementing, and managing one or more of these connections and integrating the one or more connections with the management of the networks themselves require diverse skillsets that may be not readily available to the user.

To overcome these issues associated with forming and managing robust connections between disparate networks, the multi-network system may include network connector circuitry such as network connector circuitry 80 in FIG. 5 that operate in combination with switches in network 10 and controller 18 for network 10. In the example of FIG. 5, edge switches such as switch E2B (and/or switch E2A) may be directly coupled (e.g., without any other intervening switch) to network connector circuitry 80. Through network connector circuitry 80, network traffic from network 10 can be forwarded to an external network (network 10-1 and/or network 10-2). In other words, end hosts in network 10 can be coupled (e.g., communicatively connected) to the external network (e.g., other networks including switches and end hosts, other networks external to network 10, public cloud networks, etc.) via switch E2B and network connector circuitry 80.

In particular, switch E2B may have one or more ports that are directly coupled to network connector circuitry 80 such that at least a portion of network connector circuitry 80 serves as an end host similar to any other end host coupled to edge switch E2B. One or more of these ports at switch E2B (e.g., forming one or more corresponding data forwarding paths between switch E2B and network connector circuitry 80) may be used to forward network traffic between network 10 and other networks 10-1 and/or 10-2. Controller 18 (e.g., management circuitry 106-2 in the example of FIG. 5) may be coupled to network connector circuitry 80 via one or more control paths 66. Controller 18 may therefore provide control signals and/or configuration data to network connector circuitry 80 to form suitable connections to one or more networks external to network 10.

As an illustrative example of controlling switches in network 10 and network connector circuitry 80, controller 18 may receive input (e.g., provided by a user) indicative of forming a communications connection between network 10 such as a private (enterprise) cloud network and an external network of a first type (e.g., public cloud network 10-1 implemented using a public cloud network platform). The input may include information identifying network 10-1 (e.g., a network type of network 10-1 such as a public cloud platform used to form network 10-1, a network address of network 10-1, etc.). If desired, the input may also include information indicative of a network policy for forwarding external network traffic between networks 10 and 10-1, information indicative of a type of communications connection (e.g., via Internet, a VPN tunnel, a direct connection, etc.) to be formed between networks 10 and 10-1, or any other suitable external network connection information.

Controller 18 may, based on the input, provide corresponding control signals and/or configuration data enabling network connector circuitry 80 to form a suitable connection to network 10-1. Controller 18 may identify one or more ports at one or more switches directly coupled to network connector circuitry 80 (e.g., one or more ports at switch E2B as shown in FIG. 5, one or more ports at other switches in network 10, etc.). In such a manner, controller 18 can associate these ports at corresponding switches to the connections to network 10-1 using network connector circuitry 80.

By identifying these ports and the corresponding connections to network 10-1, controller 18 may provide corresponding configuration data (e.g., flow table entries or corresponding ASIC forwarding table entries) to the switches in network 10 (e.g., all switches in network 10) such that corresponding network traffic can be forwarded to and from network connector circuitry 80 and therefore network 10-1 as desired. In other words, network packets matching some predetermined criteria (e.g., criteria for inter-network traffic) in the flow table entries may be selectively forwarded to and from network connector circuitry 80. In such a manner, a network routing policy (e.g., flow table entries identifying network connector circuitry 80 and forwarding corresponding network traffic to the one or more switch ports coupled to network connector circuitry 80 if matched) may be easily enforced across the switches in network 10 to provide a consistent and robust connection to external networks through network connector circuitry 80.

If desired, one or more of these steps of controlling switches in network 10 and network connector circuitry 80 may be automated in response to the received input (e.g., provided by the user via a graphical user interface). If desired, the one or more switch ports directly coupled to network connector circuitry 80 may be automatically discovered or identified (e.g., during system setup operations, in response to user input, etc.) by controller 18 or may be provided as a user input to controller 18. If desired, in response to the identified switch ports and/or the received input, controller 18 may automatically generate corresponding configuration data (e.g., flow table entries) for the switches to forward external network traffic to the network connector circuitry 80 via the identified switch ports. By automating one or more of these processes, an automated end-to-end connection between the corresponding end hosts of the disparate networks may be established (e.g., an automated cloud connector feature may be provided) with minimal user input, thereby simplifying the external network connection configuration and integration process.

The configuration of network connector circuitry 80 in FIG. 5 is merely illustrative. If desired, network connector circuitry 80 may be directly coupled to ports of one or more other switches, may be configured to form connections with only one, more than two, or any other suitable number of external network types, etc.

Figure 6:
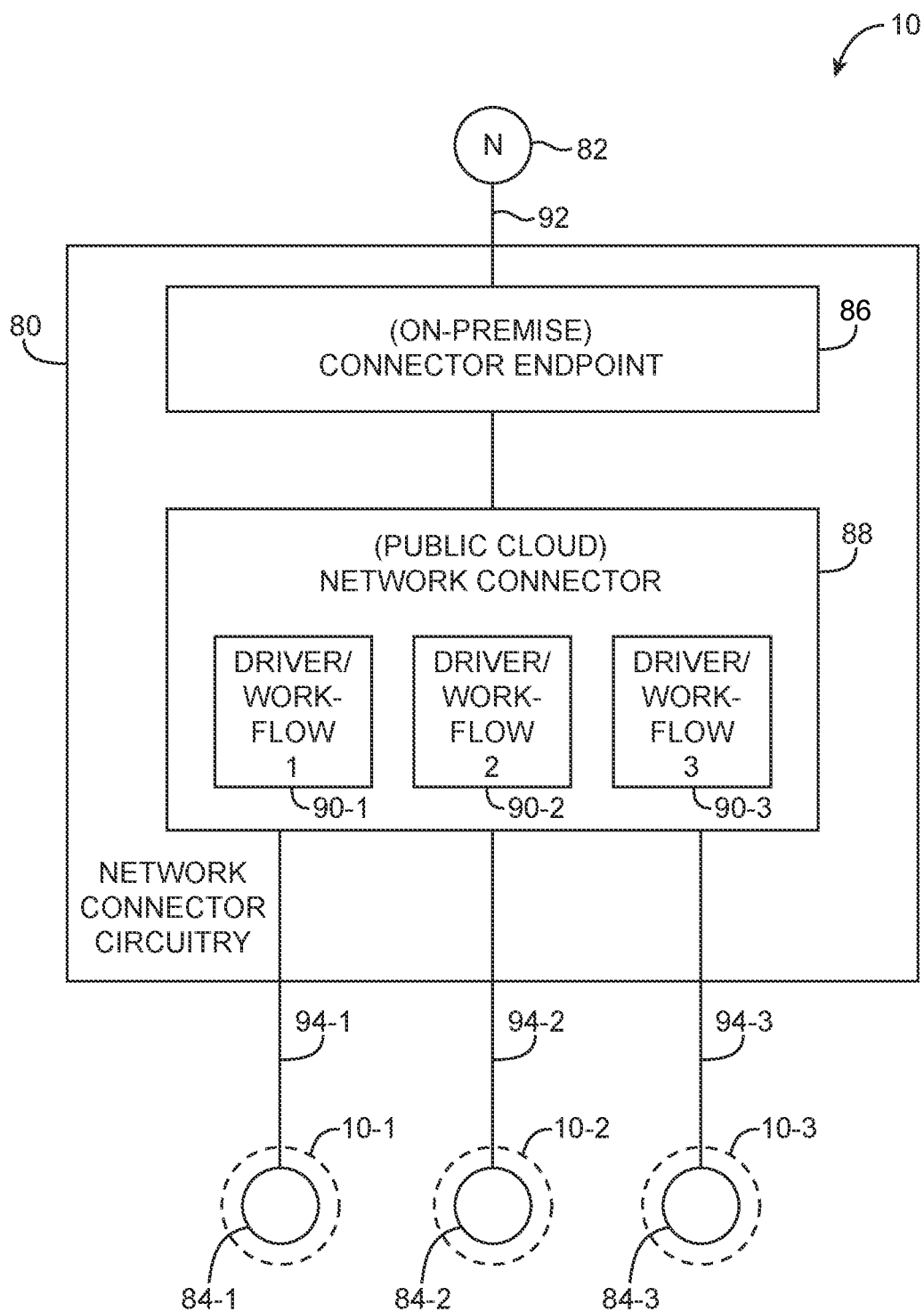
FIG. 6 is a diagram of illustrative network connector circuitry for forming connections between different networks in accordance with some embodiments.

FIG. 6 is a diagram of an illustrative configuration of network connector circuitry 80. As shown in FIG. 6, network connector circuitry 80 is coupled between a network element in network 10 and a network element in at least one external network. Network connector circuitry 80 includes a connector endpoint such as connector endpoint 86. Connector endpoint 86 is directly coupled to network element 82 in network 10 via path 92. If desired, network element 82 may be any suitable network element. Configurations in which network node 82 is a network switch such as edge switch E2B in FIG. 5 are described herein as illustrative examples. In these configurations, connector endpoint 86 may serve as an end host for external network traffic (e.g., to and from one of external networks 10-1, 10-2, or 10-3 in FIG. 6). Connector endpoint 86 may have an associated hardware address or network address, or other identifiers similar to other end hosts, based on which the external network traffic with network 10 may be forwarded to and from connector endpoint 86.

In configurations in which network 10 is a private cloud network, network 10 may be implemented using on-premise computing equipment (e.g., enterprise datacenters). In these configurations, connector endpoint 86 may sometimes be referred to herein as on-premise connector endpoint 86.

As shown in FIG. 6, network connector circuitry 80 also includes a network connector such as network connector 88 coupled to connector endpoint 86. External network traffic to and from network connector endpoint 86 may be communicated through network connector 88. Network connector 88 may be selectively configured to form connections or paths connecting connector endpoint 86 to one or more corresponding network elements in one or more external networks (e.g., networks 10-1, 10-2, and/or 10-3).

In configurations in which one or more networks 10-1, 10-2, and 10-3 are public cloud networks, networks 10-1, 10-2, and/or 10-3 may be implemented using computing equipment in public infrastructure shared by multiple enterprise entities (e.g., public cloud datacenters). In these configurations, network connector 88 may sometimes be referred to herein as public cloud network connector 88.

Depending on a configuration or implementation of network connector 88, network connector 88 may process and forward network traffic in a corresponding manner, thereby providing a data path coupling network connector endpoint 86 to one or more corresponding network elements 84 in a selected one of corresponding external networks (e.g., one of elements 84-1, 84-2, and 84-3). If desired, network elements 84 may similarly be a connector endpoint (e.g., a computing resource) at the corresponding external network, a network switch at the corresponding network, or any suitable network element at the corresponding external network.

In particular, network connector 88 may include control circuitry having compute circuitry and storage circuitry. Network connector 88 may store, at the storage circuitry, one or more drivers and workflows 90 (e.g., software instructions, protocols, etc.) each suitable for establishing a corresponding type of connection to a respective type of network and for processing network traffic associated with the corresponding type of connection. These drivers and workflows 90 when processed by the compute circuitry may establish a corresponding communications link or path 94 and enable the forwarding of network packets through the corresponding communications link 94 to one of the corresponding external networks.

In the example of FIG. 6, connector 88 may store a first set of software instructions such as a set of driver and workflow 90-1. Driver and workflow 90-1 may be specific to communicating with a type of network established using a first type of platform (e.g., a first type of public cloud network established using a first public cloud platform) and may be used to establish communications link 94-1 to communicate with the first type of network. In a similar manner, connector 88 may also store additional sets of software instructions such as sets of drivers and workflows 90-2 and 90-3, and if desired, other drivers and workflows. Each set of driver and workflow 90 (e.g., drivers and workflows 90-2 and 90-3) may be specific to communicating with a different type of external network (e.g., respective networks 10-2 and 10-3) established using a corresponding type of platform (e.g., a different type of public cloud network established using a second public cloud platform different than the first public cloud platform). In such a manner, network connector circuitry 80 may be controlled (e.g., by controller 18) to easily and flexibly provide connections from network 10 to different types of external networks.

Connector 88 may support various routing technologies (e.g., incorporate these routing technologies into forming one or more of communications links 94). As an example, connector 88 may be configured to form one or more of communications links 94 between network 10 and one of the corresponding networks 10-1, 10-2, and 10-3 using Virtual Private Network tunnels (e.g., VPN tunnels). Another example, connector 88 may form one or more of communications links 94 between network 10 and one of the corresponding networks 10-1, 10-2, and 10-3 using direct connections with Border Gateway Protocol (BGP) dynamic routing. These examples are merely illustrative. If desired, communications links 94 may be formed in any suitable manner using any desired routing technologies. In other words, driver and workflow 90 for each different type of cloud network may include corresponding instructions for implementing one or more of these technologies such as forming connections via Internet, forming network-to-network VPN tunnels, forming direct connections (e.g., dedicated connections between private and public cloud networks without an intervening public network such as via Internet), etc., using connector 88.

If desired, network parameters for forming one or more of these communications links 94 may be predetermined, identified (e.g., by controller 18), and/or indicated by user input. Each set of driver and workflow 90 may use network parameters such as identifiers for network 10 (e.g., parameters for identifying one or more connection endpoints for link 94 at network 10 such as addresses for connector endpoint 86), identifiers for a corresponding external network (e.g., parameters for identifying one or more connection endpoints for link 94 at network 10-1), a type of connection to be established between network 10 and the external network (e.g., using a VPN, using a direct connection, etc.), and other network parameters to form a corresponding communications link 94.

In some illustrative configurations, controller 18 (FIG. 5) may provide control signals and/or configuration data to network connector circuitry 80 via control path 66. As an example, controller 18 may provide configuration data such as software instructions for drivers and/or workflows 90 for communicating with external networks to network connector 88 (e.g., to be stored at storage circuitry at network connector 88). As another example, controller 18 may send control signals to control network connrctor 88 to form a connection to a corresponding external network (e.g., to process network traffic) based on a selected one of the driver and/or workflow (e.g., one set of driver and workflow instructions from the sets of driver and workflow instructions 90-1, 90-2, and 90-3), thereby forming a selected one of the links 94. As yet another example, controller 18 may provide control signals to suitably implement connector endpoint 86 (e.g., using allocated computing resources or end hosts for network 10).

If desired, controller 18 may receive user input indicative of a corresponding type of network (e.g., a public cloud network of a selected public cloud platform) to which network 10 may desirably be configured to be coupled (e.g., communicatively connected). In response to the user input, controller 18 may selectively provide the corresponding control signals and/or configuration data to connector endpoint 86 and/or network connector 88 (e.g., to configure connector endpoint 86, to provide the corresponding control signals to enable network connector 88 to process network traffic based on the corresponding set of driver and workflow instructions, etc.). If desired, one or more portions of network connector circuitry 80 (e.g., connector endpoint 86 and/or network connector 88) may be preconfigured (before communicating with controller 18) or may be configured using other circuitry.

The configuration of network connector 88 in FIG. 6 is merely illustrative. If desired, any desirable modifications may be made to network connector 88. For example, network connector 88 may store any suitable number of drivers and workflows for implementing any corresponding number of external network connections.

Implementation on Rack-based Systems

Figure 7:
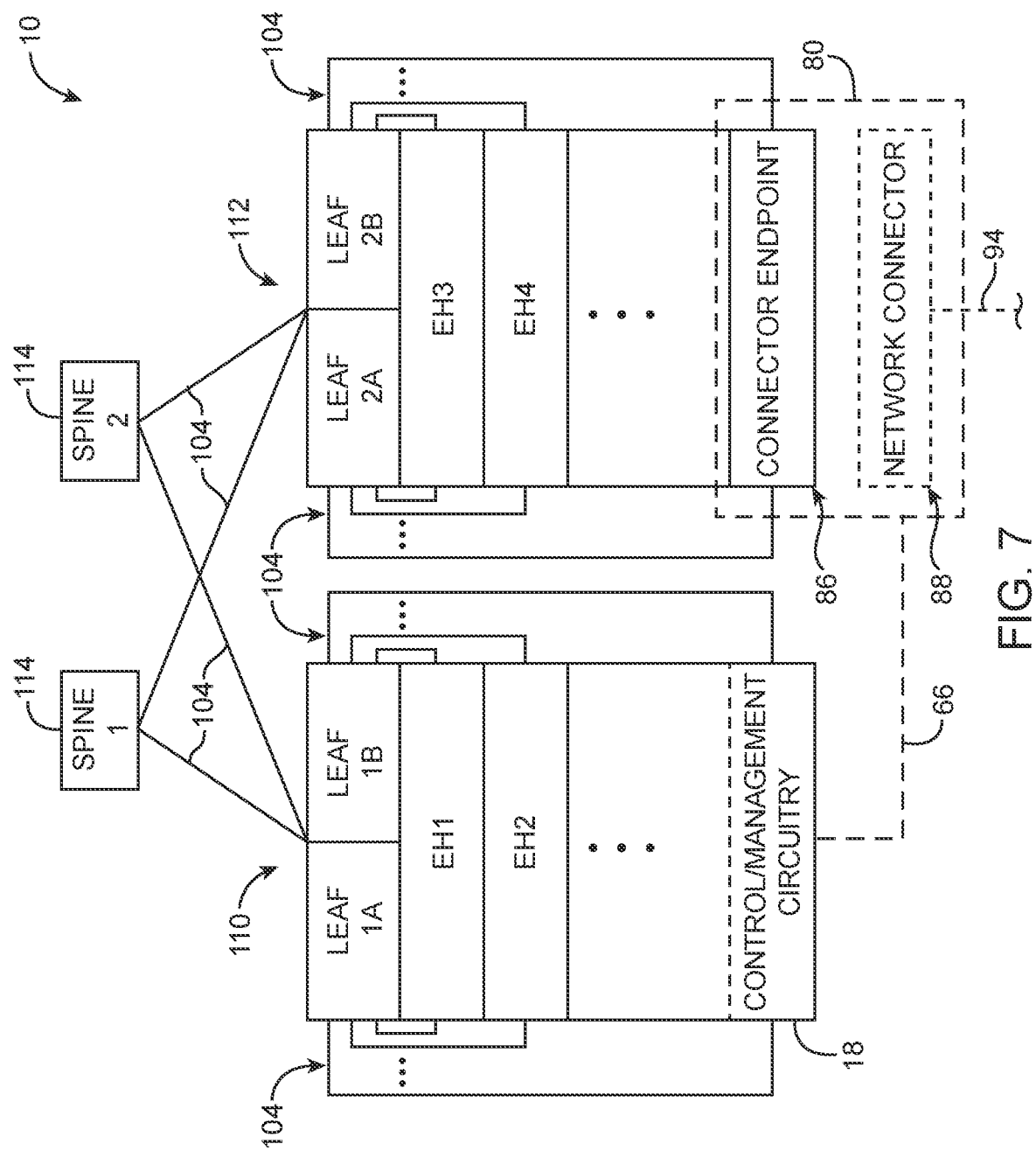
FIG. 7 is a diagram of an illustrative rack-based system that implements an underlying network having switches and network connector circuitry for connecting to other networks in accordance with some embodiments.

FIG. 7 is an illustrative example of a network such as network 10 of FIG. 5 when implemented using a rack-based system. As shown in FIG. 7, leaf switches 1A, 1B, 2A, and 2B (referred to as edge switches in FIG. 5) and end hosts are implemented using network racks 110 and 112 that are coupled to spine switches 114 (referred to as core switches in FIG. 5). Network rack 110 includes leaf switches 1A and 1B and end hosts EH1 and EH2 implemented as compute and/or storage resources. Network rack 112 includes leaf switches 2A and 2B and end hosts EH3 and EH4 implemented as compute and/or storage resources.

If desired, network 10 may include additional network racks that house additional end hosts and switches, which are coupled to spine switches 114 or other spine switches. As an example, compute and/or storage resources (e.g., generally implementing compute, store, manage, and/or any other functions, and generally referred to herein as computing resources) may form the end hosts on multiple racks for network 10. Arrangements in which end hosts EH1, EH2, EH3, EH4, and other end hosts on network racks 110 and 112 are formed from racks of server hardware used to implement computing resources (e.g., compute and/or storage resources, computing or processing circuitry, storage circuitry, network management circuitry configured to form logical network elements, and/or other networking circuitry, which are generally referred to as computing resources herein) are described herein as illustrative examples. Configurations in which each of computing resources (e.g., each of computing resources in network racks 110 and 112) is a corresponding virtual machine are described herein as example. If desired, one or more of these end hosts may be formed from any other suitable hardware or equipment.

In the example of FIG. 7, leaf switches 1A, 1B, 2A, and 2B serve as top-of-rack switches that may each be coupled via corresponding network paths 104 (e.g., data forwarding paths 104) to each end host of the corresponding network rack. As a particular illustrative example, top-of-rack switch 2A may be connected to each of the end hosts of network rack 112 (e.g., each instance of the computing resources and any other end hosts within network rack 112). The analogous connections to corresponding computing resources or end hosts may be made for each of the top-of-rack switches (e.g., switch 2B for end hosts of rack 112, switches 1A and 1B for end hosts of rack 110, etc.).

Each top-of-rack switch serves as an interface between end hosts of the corresponding network rack and other network devices such as other portions of network 10 or other networks (e.g., an external network coupled to a leaf switch). Network traffic to or from end hosts of network rack 110 may be required to traverse at least one of the top-of-rack switches of network rack 110 (e.g., one of top-of-rack switches 1A and 1B). Similarly, network traffic of network rack 112 may be required to traverse at least one of switches 2A and 2B.

If desired, switches may be implemented using computing equipment of network racks 110, and/or 112. In other words, one or more of leaf switches in network 10 may be implemented using one or more corresponding software switches. As an example, a software switch may be implemented using computing equipment such as an end host of network rack 110 (e.g., a computing resource in network rack 110). The software switch may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

The software switch may interface with end hosts in the corresponding rack (e.g., in the same rack in which the software switch is formed). In other words, shared computing equipment (e.g., computing resources in a given network rack) may be used to implement the software switch and the end hosts with which the software switch is interfaced. If desired, multiple end hosts (e.g., computing resources) may be implemented in software on the shared computing equipment. For example, tens, hundreds, thousands, or more end hosts may be implemented on the shared computing equipment and logically coupled in software to logical ports of the software switch, whereas the software switch is connected to other physical switches in network 10 by physical ports of the shared computing equipment on which the software switch itself is implemented.

In the example of FIG. 5, controller 18 is shown to be implemented separately from switches and end hosts. This is merely illustrative. If desired, as in the example of FIG. 7, controller 18 may be implemented on racks 110 and/or 112 and may be configured to control spine switches and leaf switches via control paths 66 that coincide with data forwarding paths 104. If desired, controller 18 may be implemented in a network rack (e.g., using the resources of a line card or other computing equipment of network rack 110 and/or any other network rack). Controller 18 may communicate with the top-of-rack switches and core switches by sending control packets and receiving control plane packets from the switches.

In one illustrative arrangement shown in FIG. 7 as an example, network connector circuitry 80 (in FIGS. 5 and 6) may be implemented using one or more network racks such as network rack 112. In particular, in the example of FIG. 7, connector endpoint 86 may be implemented on rack 112 as an end host (e.g., using computing resources on rack 112) in a manner similar to end hosts EH3 and EH4. Leaf switches 2A and 2B may each have one or more corresponding ports directly coupled to connector endpoint 86 via corresponding data forwarding paths 104.

Connector endpoint 86 may routing traffic to and from network connector 88 and consequently to and from an external network coupled via communications link 94. While network connector 88 is shown to be implemented separately from network racks (e.g., network rack 112), this is merely illustrative. If desired, network connector 88 may similarly be implemented on one or more network racks (e.g., network rack 112) using one or more computing resources serving as end hosts for network 10 (e.g., storage resources that store driver and workflow 90 for forming communications link 94, compute resources that process software instructions from driver and workflow 90 to form communications link 94, etc.).

Controller 18 may be coupled to network connector circuitry 80 via control path 66. While control path 66 between controller 18 and network connector circuitry 80 is shown to be separate from data forwarding paths 104, control path 66 between controller 18 and network connector circuitry 80 may similarly be formed from (e.g., implemented using) data forwarding paths 104 traversing through the network racks.

The configuration of network connector circuitry 80 and implementation of network 10 using network racks 110 and 112 and corresponding server hardware in FIG. 7 are merely illustrative. If desired, network elements in network 10 (e.g., controller, switches, end hosts, network connector circuitry, etc.) may be distributed and implemented in any suitable manner across any number of network racks having any suitable number of computing resources (e.g., implemented from corresponding server hardware).

Network Virtualization

Figure 8:
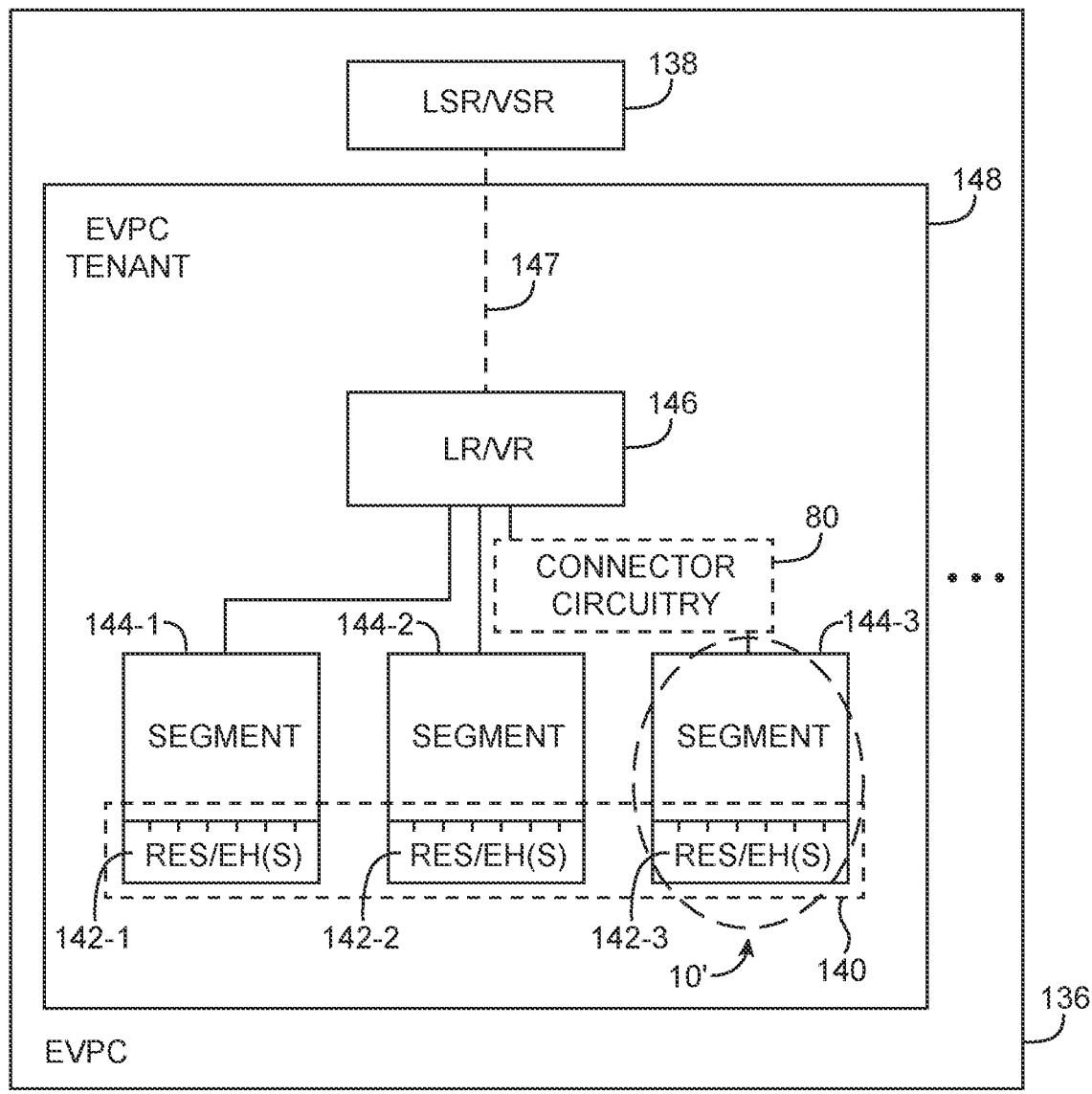
FIG. 8 is a diagram of illustrative private cloud network elements generated using controller circuitry based on an underlying network of switches and coupled to network connector circuitry for connecting to one or more public cloud networks in accordance with some embodiments.

In configurations in which network connector circuitry 80 connects a private cloud network to a public cloud network to form a hybrid-cloud system, one or both of the cloud networks may form virtual cloud networking elements overlaying its underlying network elements. FIG. 8 is a diagram of illustrative virtual or logical elements such as virtual private cloud network elements (e.g., enterprise virtual private cloud (EVPC) networking elements) formed from a network of underlying switches (e.g., from spine switches and leaf switches in network 10 in FIG. 5 or FIG. 7) and coupled to corresponding virtual public cloud network elements at a public cloud network 10' using public cloud network connector circuitry 80. In the example of FIG. 8, a controller such as controller 18 (FIG. 5 or 7) may configure and control a network of underlying physical and/or software-based switches such as network 10 (FIG. 5 or 7) to form an EVPC network 136 defined by the virtual networking elements therein such as EVPC tenant 148, segments 144, transit gateway 138 (sometimes referred to as virtual system router 138) for a system tenant, etc. These virtual networking elements may suitably organize corresponding computing resources for the private cloud network and computing resources for the public cloud network coupled to the respective networks of underlying switches.

In general, to implement one or more of these virtual elements, the underlying switches may store the properties and characteristics used by the underlying network elements assigned to and defining the virtual elements. As an example, virtual routers defining the tenants may be implemented by and be referred to as a first set of routing tables stored at one or more switches or other network elements. Similarly, virtual system routers defining the system tenants may be implemented by and be referred to as a second set of routing tables stored at one or more switches or other network elements. These virtual routers may include interfaces that are assigned and connected to corresponding segments. These virtual router interfaces may be sometimes referred to as associations with a corresponding routing table in the first set of routing tables. Virtual system routers may include interfaces that are assigned or connected to virtual routers or tenants. These virtual system router interfaces may sometimes be referred to as associations with a corresponding routing table in the second set of routing tables. In other words, the interfaces for the virtual routers and virtual system routers may be defined and implemented by corresponding associations in the corresponding routing tables in the sets of routing tables for the virtual routers and virtual system routers.

The virtual elements in EVPC network 136 may therefore be formed from association information stored on underlying switches in the private cloud network (e.g., network 10). In particular, controller 18 may provide control signals and/or configuration data to the underlying switches in the private cloud network to map elements in EPVC network 136 onto the underlying switches (e.g., by assigning the identifying network attributes of these virtual elements to the underlying switches, by assigning different associations to corresponding routing tables in the underlying switches, etc.). Elements in EVPC network 136 may be updated over time to implement and include any suitable virtual networking elements on the basis of underlying private cloud network.

In the example of FIG. 8, EVPC network 136 includes and defines one or more EVPC tenants, such as EVPC tenant 148, and an EVPC tenant includes and defines one or more network segments associated with one or more computing resources 142 (e.g., collectively forming one or more computing clusters 140). In particular, EVPC tenant 148 includes segments 144-1 and 144-2 formed in the private cloud network, and segment 144-3 formed in the public cloud network 10'. Each segment within EVPC tenant 148 may be associated with (e.g., may be further partitioned into) at least one subnet (e.g., defined by a range of IP addresses). Each segment may be implemented to provide direct packet forwarding (e.g., switching) functions within that segment.

Each segment 144 includes ports that are each connected to a suitable number of end hosts or computing resources within the private cloud network (e.g., one or more of end hosts EH1, EH2, EH3, or EH4 in FIG. 7) or to a suitable number of end hosts or computing resources within public cloud network 10'. The ports of each segment (sometimes referred to as virtual ports of that segment) are distributed across ports of any corresponding underlying physical and/or software switches. These segments may be defined by different network attributes of the corresponding end hosts coupled to these ports. As an example, to assign the given end host to a given segment and thereby define the given segment, controller 18 may define a virtual port of the given segment using the MAC address of the given end host and/or the VLAN of the given end host and provide the MAC address and VLAN of the given end host to the underlying switches. In other words, a virtual port may be implemented by a combination of a MAC address and a VLAN for the given end host stored at the underlying switches. In similar manner, controller 18 may also establish one or more virtual ports and additional segments such as segments 144-2 for corresponding end hosts or computing resources. Segment 144-3 for public cloud network 10' may also be established in a similar manner for corresponding end hosts or computing resources in public cloud network 10'.

In the example of FIG. 8, EVPC tenant 148 includes a virtual router 146 (sometimes referred to as a logical router) that is connected to the one or more network segments in EVPC tenant 146. Controller 18 may implement virtual router 146 by assigning virtual router interfaces for virtual router 146 to corresponding IP domains associated with the one or more network segments 144. These virtual router interfaces (and their IP domain assignments) may be implemented as associations in routing tables stored at corresponding underlying switches. As an example, EVPC tenant 148 may include virtual router 146. Virtual router 146 may include respective interfaces each assigned to (e.g., each connected to) a corresponding one of segments 144-1, 144-2, and 144-3 (e.g., each assigned to a corresponding subnet within EVPC tenant 148, etc.).

Configured in this manner, virtual routers (e.g., underlying switches implementing the virtual routers as configured by controller 18) such as virtual router 146 may perform network routing functions and provide isolation between the different segments (e.g., different subnets, different broadcast domains, etc.). In particular, to facilitate communication between different segments (e.g., within and/or external to a particular EVPC tenant), network routing functions performed by a virtual router may include modifying headers of network packets received at the virtual router interfaces.

One or more virtual routers (e.g., in EVPC network 136) may include interfaces coupled to a virtual system router 138 (sometimes referred to herein as a logical system router). A controller such as controller 18 may implement the virtual system router by assigning virtual system router interfaces to virtual routers (e.g., virtual router interfaces). These virtual system router interfaces (and their virtual router interface assignments) may be implemented as associations in additional routing tables stored at corresponding underlying switches. As an example, virtual system router 138 may identify, at its interfaces, the corresponding virtual routers by their respective MAC addresses, by their respective data encapsulation schemes, by any other suitable schemes other than using IP addresses. In particular, virtual system router 138 may only be directly connected to (e.g., may only directly interact with) virtual routers in EVPC network 136 (e.g., without being directly connected to end hosts, without directly interacting with segment virtual ports, without being directly connected to external routers, etc.).

As an example, controller 18 may control underlying network switches to assign or connect a virtual router (e.g., virtual router 146 for EVPC tenant 148) having segments 144 to an interface for virtual system router 138 for a system tenant, thereby providing a Transit Gateway function between EVPC tenant 148 and other EVPC tenants. In a similar manner (e.g., based on other corresponding virtual router interfaces information for other tenants), controller 18 may control underlying network switches to assign other virtual routers to corresponding virtual system router interfaces. Configured in this manner, a virtual system router (e.g., an underlying switch implementing a function of the virtual system router) such as virtual system router 128 may perform network routing functions and provide isolation between different VPC tenants. In particular, to facilitate communication between different VPC tenants, network routing functions performed by a virtual system router may include modifying headers of network packets received at the virtual system router interfaces.

As described above, it may be desirable to form a hybrid-cloud system by communicatively coupling underlying private cloud network 10 (e.g., overlaid by EVPC network 136) to public cloud network 10'. In particular, cloud network connector circuitry 80 may form a communications path between virtual elements in the private cloud network and virtual elements in public cloud network 10'. As an example, connector circuitry 80 may connect segment 144-2 for computing resources 142-2 on the private cloud network to segment 144-3 for computing resources 142-3 on public cloud network 10'.

In general, once connector circuitry 80 is deployed and establishes a physical connection between underlying elements of the private and public cloud networks, the virtual topology shown in FIG. 8 may overlay connector circuitry 80. In other words, once a public cloud connection is formed using connector circuitry 80, connector endpoint 86 in connector circuitry 80, which is coupled to one or more underlying switches in the private cloud network, may be organized in different manners in the overlaid virtual network, thereby forming and/or coupling to different virtual elements in FIG. 8. If desired, the hardware address, network address, and any other properties of connector endpoint 86 may be used to form a virtual port coupled to a segment (e.g., segment 144-3).

In the example of FIG. 8, connector circuitry 80 is coupled between an interface of virtual router 146 and segment 144-3 in public cloud network 10'. However, connector circuitry 80 may not serve any particular virtual functions other than providing the underlying connection allowing segment 144-3 in public cloud network 10' to interface with other segments 144-2 and 144-1 in the private cloud network.

Regardless of how cloud network connector circuitry 80 (e.g., connector endpoint 86) is virtualized, controller 18 may still identify a location of on-premise connector endpoint 86 (e.g., identify an underlying switch port to which on-premise connector endpoint 86 is directly coupled), configure one or more underlying switches (e.g., from which one or more virtual elements in EVPC 136 are formed) to forward external network traffic to and from the underlying switch port directly coupled to on-premise connector endpoint 86, provide configuration data to public cloud network connector 88 to form a corresponding communications path 94, forward the external network traffic to and from on-premise connector endpoint 86 using communications path 94, etc.

The configurations of network connector circuitry 80, public cloud network 10', and EPVC network 136 in FIG. 8 are illustrative. If desired, each of these elements may be organized in other manners, some of these elements may be omitted, and/or additional instances of each of these elements may be included.

Switch Modules for Network Virtualization

Figure 9:
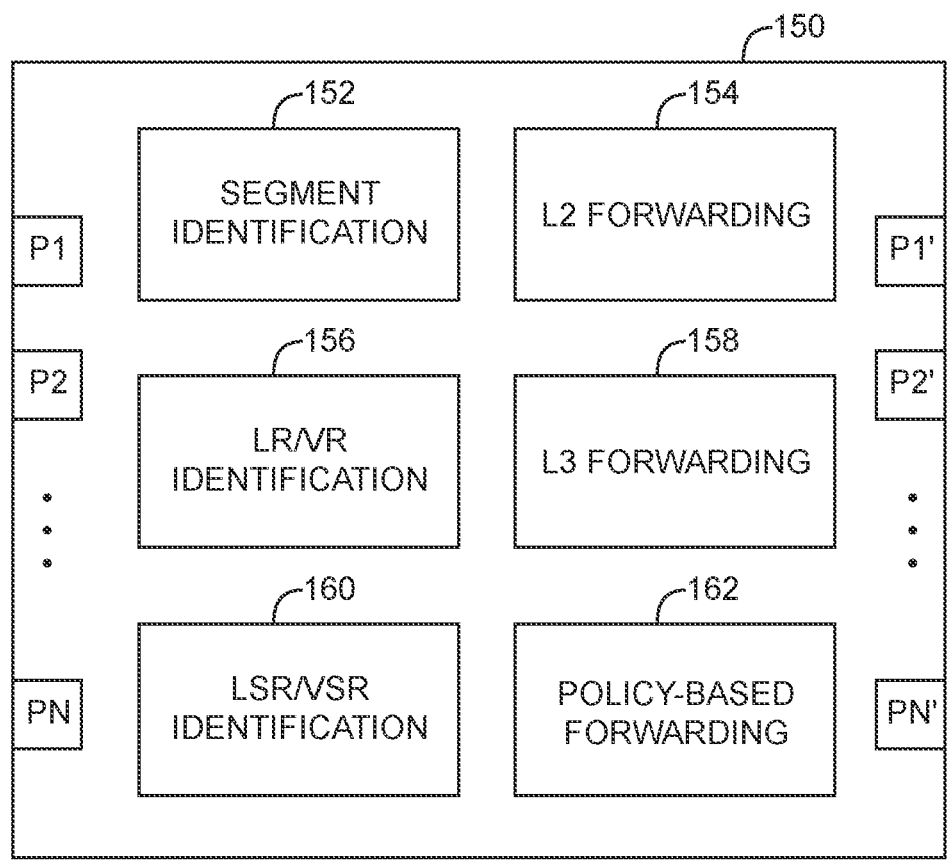
FIG. 9 is a diagram of an illustrative switch having modules that each performs different packet forwarding functions (e.g., switching functions and routing functions) in accordance with some embodiments.

In order to implement the illustrative virtual elements described in connection with FIG. 8 over underlying physical and/or software switches described in connection with FIG. 5 or 7, the underlying switches may be configured to implement multiple types of forwarding operations (e.g., switching and/or routing functions). FIG. 9 is an illustrative block diagram of a switch 150 such as a physical or software switch that may store different types of configuration data for performing packet forwarding and routing based on virtual elements as described in connection with FIG. 8. Switch 150 may, for example, be a leaf switch such as leaf switches 1A, 1B, 2A, or 2B of FIG. 7 (or a corresponding edge switch in FIG. 6) or may be a spine switch such as spine switches 1 or 2 of FIG. 7 (or a corresponding core switch in FIG. 6). In other words, switch 150 may be an underlying switch, which includes circuitry for implementing the virtual elements described in connection with FIG. 8. Controller circuitry 18 (FIG. 7) may provide corresponding data to one or more modules of switch 150 to implement the private cloud elements in FIG. 8, as an example.

As shown in FIG. 9, switch 150 may include ports such as ports P1, P2, . . . , PN, P1', P2', . . . , PN', etc. (i.e., any suitable number of input ports, output ports, shared input-output ports, etc.). Switch 150 may include segment identification module 152, L2 forwarding module 154, logical or virtual router identification module 156, L3 forwarding module 158, logical or virtual system router identification module 160, and policy-based forwarding module 162. The modules may be implemented using respective dedicated circuitry, may be implemented using shared dedicated circuitry, or may be implemented using software processed on processing circuitry (e.g., by processing software instructions stored on memory circuitry such as non-transitory computer-readable storage media accessed by the processing circuitry). For example, these modules may be implemented using packet processing software 26 on control unit 24 of FIG. 1 (e.g., processing packet processing software stored on memory circuits of control circuit 24) and/or packet processing circuitry 32. These modules may perform functions based on stored flow table entries or other configuration or control data provided by a controller such as controller 18.

A network packet received at one of the switch ports may be processed by one or more of the modules in determining how to forward the network packet. The modules may process the network packet in any desired sequence or in parallel. The operations performed by each module may be controlled by a controller such as controller 18.

Segment identification module 152 may determine a segment within a given EVPC tenant that a received network packet is assigned to. This may be determined based on network attributes associated with the network packet (e.g., incoming port, VLAN, source address information such as source MAC or IP address, etc.). As an example, the network attributes may be indicative of a virtual port of a segment the source end host is attached to. Module 152 may provide information identifying the segment (e.g., the segment virtual port) to L2 forwarding module 154. L2 forwarding module 154 may perform network forwarding based on the segment information provided by module 152 (e.g., perform forwarding decisions at layer 2 of the Open Systems Interconnection (OSI) model). For example, L2 forwarding module 154 may determine an underlying physical or software switch port that the received network packet should be forwarded to. This may be determined based on the segment information and additional packet information such as a destination MAC address retrieved from the received network packet.

Configured with segment identification module 152 and L2 forwarding module 154, switch 150 (in combination with other similarly configured switches) may perform forwarding functions within a segment as described in connection with FIG. 8 (e.g., to implement the functions of segments 144-1, 144-2, and 144-3 corresponding to different subnets in EVPC tenant 148). In scenarios such as when a destination end host of a received network packet is associated with a different subnet or segment than the source end host, switch 150 may use virtual router identification module 156 and L3 forwarding module 158 to perform routing operations.

Virtual router identification module 156 may identify an associated EVPC tenant (e.g., a virtual router for the EVPC tenant) that should be used in controlling the network packet. Module 156 may use network attributes of the network packet along with information received from other modules of the switch. For example, module 156 may use identified EVPC segment information received from L2 forwarding module 154 along with IP address information retrieved from the network packet in determining which virtual router (for which EVPC tenant) controls the network packet. In particular, the segment information may identify virtual router interfaces of a virtual router that are assigned to the subnets associated with the IP address information from the network packets.

Virtual router identification module 156 may provide the identified EVPC tenant information (e.g., virtual router information) to L3 forwarding module 158. L3 forwarding module 158 may perform network routing operations based on the identified EVPC tenant information and based on additional information retrieved from the network packet. As an example, L3 forwarding module 158 may use IP header fields such as destination address fields to determine which port of switch 150 should be used in forwarding the network packet. In performing network routing operations, L3 forwarding module 158 may modify the network packet. For example, module 158 may decrement a (time-to-live) TTL header field and may rewrite layer 2 header fields such as source and destination MAC addresses.

Switch 150 may include policy-based forwarding module 162 that may process the network packets after the packets have been processed by L2 forwarding module 154 and/or L3 forwarding module 158 (e.g., packets may be passed to module 162 prior to passing the packets to an egress port on switch 150). Module 162 may serve as an override to forwarding modules 154 and 158 in determining which port to route data packets to. Module 162 may perform network routing and network access control operations based on network policy rules identified by controller 18 and information retrieved from the network packet.

If desired, switch 150 may also include virtual system router identification module 160 that identifies a virtual system router that should be used in controlling the network packet. The virtual system router identification module may identify which virtual system router should be used in controlling the network packet and may use network attributes of the network packet along with information received from other modules of the switch. The virtual system router identification module may provide virtual system router information to L2 forwarding module 154, L3 forwarding module 158, and/or policy-based forwarding module 162. Modules 154, 158, and 162 may perform network routing operations based on the identified virtual system router information and based on information retrieved from the network packet.

In scenarios such as when a destination end host of a received network packet is associated with an EVPC tenant (e.g., a different virtual router) than the source end host, switch 150 may use virtual system router identification module 160 (and L2 forwarding module 154 and/or policy-based forwarding module 162) for performing forwarding operations. As an example, in connection with FIG. 8, a network packet sent from computing resource 142-1 in segment 144-1 of EVPC tenant 148 may be destined for an end host external to EVPC tenant 148. In other words, the EVPC tenancy associated with source end host is different from the EVPC tenancy associated with destination end host. In these scenarios, network routing at a virtual system router level may be required. In particular, any suitable network attributes may be used to identify the different virtual system router interfaces at which the corresponding virtual routers for the different EVPC tenants are connected, thereby providing the appropriate forwarding between different EVPC tenants.

Referring back to module 162 in FIG. 9, controller 18 (FIG. 6 or 7) may be used to apply and enforce network policy rules at virtual interfaces of the virtual network such as EVPC network 136 in FIG. 8 (e.g., virtual ports of distributed segments, interfaces of distributed virtual routers, or interface of virtual system routers). Network policy rules may include network routing rules (sometimes referred to herein as policy-based routing (PBR) rules) that help determine network paths between end hosts and may include access control lists that allow or block selected network traffic. If desired, controller 18 may receive access control list and/or network routing rules from a user as the network policy rules (e.g., the user may specify an access control list and network routing rules simultaneously to controller 18). Controller 18 may provide forwarding rules implementing the access control list policy rules and network routing rules (e.g., as flow table entries or as other types of control and configuration data) for implementation on module 162 of switches 150.

In general, any desired network attributes such as one or more virtual ports, virtual router and system router interfaces, physical ports and/or packet header fields may be identified in an access control list to specify a suitable policy for network 100 in FIG. 6 or 7 and for EVPC network 136 in FIG. 8. Controller 18 may generate flow table entries for the underlying switches in network 100 that implement the network policy rule defined by such an access control list.

The flow table entries may be provided to one or more physical or hypervisor switches in implementing the access control list (e.g., for implementation on module 162 of switch 150 as shown in FIG. 9). In scenarios where the access control list is combined with a policy-based routing entry that is provided by a user, flow table entries having an action field for forwarding the data packet to a desired destination may also be generated. If desired, flow table entries implemented on switch 150 for module 162 may process data packets after the packets have been processed by L2 forwarding module 154 and/or L3 forwarding module 158. If desired, module 162 may override the forwarding determinations made at modules 154 and 158.

The modules of the switch 150 may collectively implement a flow table such as flow table 28. For example, flow table entries operating only on layer 2 header fields may be implemented using (e.g., may be stored at) segment identification module 152 and L2 forwarding module 154. As another example, flow table entries operating only on layer 3 header fields may be implemented using (e.g., may be stored at) virtual router identification module 156 and L3 forwarding module 158. As yet another example, flow table entries operating on both layer 2 and layer 3 header fields may be implemented using (e.g., stored at) segment identification module 152, L2 forwarding module 154, virtual router identification module 156 and L3 forwarding module 158. Flow table entries implemented on (e.g., stored at) virtual system router identification module 160 and policy-based routing module 162 may operate on any desired fields of the received packets.

The example of FIG. 9 in which modules 152, 154, 156, 158, 160, and 162 are implemented separately is merely illustrative. If desired, the functions of any two or more modules may be merged and implemented using shared circuitry. The modules may be implemented as software modules in a software switch such as a hypervisor switch or may be implemented using dedicated circuitry. Each switch 150 may be capable of performing both network forwarding and network routing, which helps to allow a controller to implement distributed network segments, virtual routers, and virtual system routers. If desired, one or more of these modules may be omitted from one or more of switches 150. If desired, a first switch in a network may be configured to implement the functions of traffic forwarding within segments and the functions of packet routing for virtual routers between different segments, and a second switch in the network may be configured to implement the functions of packet routing for a virtual system router between virtual router.

The configurations of FIGS. 8 and 9 describing how controller 18 may configure network 10 to form one or more EVPC tenants within a single EVPC network 136 are merely illustrative. If desired, controller 18 may be configured to control switches to form one or more EVPC networks.

The foregoing is merely illustrative of the principles of this invention and various modifications can be made by those skilled in the art without departing from the scope and spirit of the invention.

What is claimed is:

1. A networking system comprising:
   network connector circuitry having a connector endpoint configured to be coupled to a switch port in a first cloud network and having a cloud network connector configured to couple the connector endpoint to a second cloud network, wherein the network connector circuitry stores multiple workflows, and each workflow, when processed by the network connector circuitry, implements a connection to a different type of cloud network; and
   a controller coupled to the network connector circuitry, and configured to provide an indication of a network type of the second cloud network to the network connector circuitry, wherein the network connector circuitry is configured to process a selected one of the multiple workflows corresponding to the network type of the second cloud network based on the received indication to implement a connection to the second cloud network.

2. The networking system defined in claim 1, wherein the controller is configured to provide a control signal, as the indication, to the network connector circuitry for processing the selected workflow corresponding to the network type of the second cloud network.

3. The networking system defined in claim 1, wherein the first cloud network comprises a private cloud network, and the second cloud network comprises a public cloud network.

4. The networking system defined in claim 1, wherein each of the multiple workflows, when processed by the network connector circuitry, implements a public cloud network connection for a different type of public cloud platform.

5. The networking system defined in claim 1, wherein the first cloud network comprises a plurality of additi switches, and wherein the controller is configured to identify the switch port to which the connector endpoint is coupled and to provide the configuration data to the plurality of switches, the configuration data comprising a forwarding table entry associating network traffic for the second cloud network to the connector endpoint.

6. The networking system defined in claim 1, wherein the cloud network connector stores a corresponding driver for each of the workflows.

7. The networking system defined in claim 1, wherein the multiple workflows include an additional workflow for an additional network type different from the network type of the second cloud network, and the additional workflow is unused for implementing the connection to the second cloud network.

8. The networking system defined in claim 1, wherein the connection implements a virtual private network (VPN) tunnel connection.

9. The networking system defined in claim 1, wherein the connection implements a direct connection between the first cloud network and the second cloud network.

10. The networking system defined in claim 1, wherein at least a portion of the network connector circuitry is formed from computing resources on server hardware.

11. The networking system defined in claim 10, wherein the switch port is on a leaf switch coupled to the connector endpoint, the connector endpoint formed from the computing resources on the server hardware.

12. A method of operating controller circuitry to control a switch in a private cloud network and to control network connector circuitry coupling the private cloud network to a public cloud network, the method comprising:
receiving an input indicative of the public cloud network;
identifying a switch port of the switch coupled to the network connector circuitry;
controlling the network connector circuitry to form a connection to the public cloud network based on the input by processing a given instruction set in a plurality of instruction sets available to the network connector, wherein each instruction set in the plurality of instruction sets is used in communicating with a different type of public cloud network, the given instruction set corresponding to a type of the public cloud network coupled to the private cloud network; and
providing configuration data to the switch to forward a received network packet to the network connector circuitry through the switch port.

13. The method defined in claim 12, further comprising:
receiving a network policy associated with the public cloud network, wherein the network policy is associated with the configuration data; and
providing the configuration data to additional switches in the private cloud network.

14. The method defined in claim 12, wherein controlling the network connector circuitry to form the connection comprises providing a control signal for selecting the given instruction set out of the plurality of instructions sets based on the input indicative of the public cloud network.

15. The method defined in claim 12, further comprising:
forming a network segment in the private cloud network having a virtual port formed from an underlying switch port coupled to a computing resource for the private cloud network; and
forwarding network traffic from the computing resource through the virtual port to the public cloud network using the connection.

16. The method defined in claim 15, further comprising:
forming a private cloud tenant with an associated virtual router in the private cloud network having a virtual router interface assigned to the network segment, wherein forwarding the network traffic comprises forwarding the network traffic from the computing resource through the virtual router interface to the public cloud network using the connection.

17. The method defined in claim 16, wherein forming the network segment and forming the private cloud tenant with the associated virtual router comprises providing segment identification information and virtual router identification information to switches in the private cloud network.

18. A non-transitory computer-readable storage medium comprising instructions for:
receiving information indicative of a switch port coupled to a network connector endpoint at a first cloud network;
controlling a cloud network connector to form a connection between the network connector endpoint and a second cloud network;
receiving an indication of a network type of the second cloud network, wherein controlling the cloud network connector to form the connection comprises selecting a corresponding workflow with which the connection is formed based on the indication of the network type of the second cloud network;
receiving a network policy associated with communicating with the second cloud network; and
based on the network policy, sending configuration data to switches in the first cloud network, the configuration data comprising information for identifying a set of network packets to be communicated with the second cloud network and information for forwarding the set of network packets to the network connector endpoint.

19. The non-transitory computer-readable storage medium defined in claim 18, further comprising instructions for:
controlling the cloud network connector to store a plurality of workflows each of which is associated with forming a connection with a different network type.

* * * * *